United States Patent
Wang

(10) Patent No.: US 9,686,542 B2
(45) Date of Patent: Jun. 20, 2017

(54) NETWORK ABSTRACTION LAYER HEADER DESIGN

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 609 days.

(21) Appl. No.: 14/019,322

(22) Filed: Sep. 5, 2013

(65) Prior Publication Data

US 2014/0064384 A1    Mar. 6, 2014

Related U.S. Application Data

(60) Provisional application No. 61/697,265, filed on Sep. 5, 2012.

(51) Int. Cl.
| | |
|---|---|
| *H04N 7/12* | (2006.01) |
| *H04N 11/02* | (2006.01) |
| *H04N 11/04* | (2006.01) |
| *H04N 19/169* | (2014.01) |
| *H04N 21/236* | (2011.01) |
| *H04N 21/845* | (2011.01) |
| *H04N 21/434* | (2011.01) |

(52) U.S. Cl.
CPC . *H04N 19/00327* (2013.01); *H04N 21/23605* (2013.01); *H04N 21/4343* (2013.01); *H04N 21/8451* (2013.01)

(58) Field of Classification Search
CPC ......... H04N 21/23605; H04N 21/4343; H04N 21/8451
USPC .................................................. 375/240.26
See application file for complete search history.

(56) References Cited

U.S. PATENT DOCUMENTS

| | | | |
|---|---|---|---|
| 2005/0099869 A1* | 5/2005 | Crinon | H04N 19/44 365/222 |
| 2011/0019746 A1* | 1/2011 | Lim | H04N 19/597 375/240.25 |
| 2013/0003579 A1 | 1/2013 | Lu et al. | |
| 2013/0034170 A1* | 2/2013 | Chen | H04N 13/00 375/240.25 |
| 2013/0094774 A1* | 4/2013 | Misra | H04N 19/70 382/233 |
| 2013/0194384 A1 | 8/2013 | Hannuksela | |

OTHER PUBLICATIONS

Wang, Ye-Kui; Hannuksela, M.M.; Pateux, S.; Eleftheriadis, A.; Wenger, Stephan, "System and Transport Interface of SVC," in Circuits and Systems for Video Technology, IEEE Transactions on , vol. 17, No. 9, pp. 1149-1163, Sep. 2007.*
Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Jeremaiah C Hallenbeck-Huber
(74) *Attorney, Agent, or Firm* — Shumaker & Sieffert, P.A

(57) ABSTRACT

A video processing device can receive in an encoded bitstream of video data a network abstraction layer (NAL) unit and parse a first syntax element in a header of the NAL unit to determine a temporal identification (ID) for the NAL unit, wherein a value of the first syntax element is one greater than the temporal identification.

36 Claims, 6 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCIVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19 , 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Schierl, et al., "RTP Payload Format for High Efficiency Video Coding," draft-schierl-payload-rtp-h265-02.txt, Jun. 11, 2013, 69 pp.

Wang, et al., "AHG9: Various comments on HEVC draft 7," Document JCTVC-J0112, Jul. 11-20, 20125, 7 pp.

\* cited by examiner

NETWORK ABSTRACTION LAYER HEADER DESIGN

This application claims the benefit of U.S. Provisional Application No. 61/697,265, filed 5 Sep. 2012, the entire content of which is incorporated by reference herein.

TECHNICAL FIELD

This disclosure relates to video data processing and, more particularly, to the generating and processing of network abstraction layer (NAL) units.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates to video coding (i.e., encoding and/or decoding of video data) and video processing, and more particularly, this disclosure describes Network Abstraction Layer (NAL) unit header designs that may be applicable to video coding standards, such as the newly emerging High Efficiency Video Coding (HEVC) standard and its extensions.

In one example, a method of processing video data includes receiving in an encoded bitstream of video data a network abstraction layer (NAL) unit and parsing a first syntax element in a header of the NAL unit to determine a temporal identification (ID) for the NAL unit, wherein a value of the first syntax element is N greater than the temporal identification, where N is a positive integer.

In another example, a method of processing video data includes generating, for inclusion in an encoded bitstream of video data, a network abstraction layer (NAL) unit; determining a temporal identification for the NAL unit; and, setting a first syntax element in a header of the NAL unit to N greater than the temporal identification, where N is a positive integer.

In another example, a device for processing video data includes one or more processors configured to receive in an encoded bitstream of video data a network abstraction layer (NAL) unit; and parse a first syntax element in a header of the NAL unit to determine a temporal identification (ID) for the NAL unit, wherein a value of the first syntax element is N greater than the temporal identification, where N is a positive integer.

In another example, an apparatus for processing video data includes means for receiving in an encoded bitstream of video data a network abstraction layer (NAL) unit; and, means for parsing a first syntax element in a header of the NAL unit to determine a temporal identification (ID) for the NAL unit, wherein a value of the first syntax element is N greater than the temporal identification, where N is a positive integer.

In another example, a computer-readable storage medium storing instructions that when executed by one or more processors cause the one or more processors to receive in an encoded bitstream of video data a network abstraction layer (NAL) unit and parse a first syntax element in a header of the NAL unit to determine a temporal identification (ID) for the NAL unit, wherein a value of the first syntax element is N greater than the temporal identification, where N is a positive integer.

The details of one or more examples are set forth in the accompanying drawings and the description below. Other features, objects, and advantages will be apparent from the description and drawings, and from the claims.

DETAILED DESCRIPTION

Figure 1:
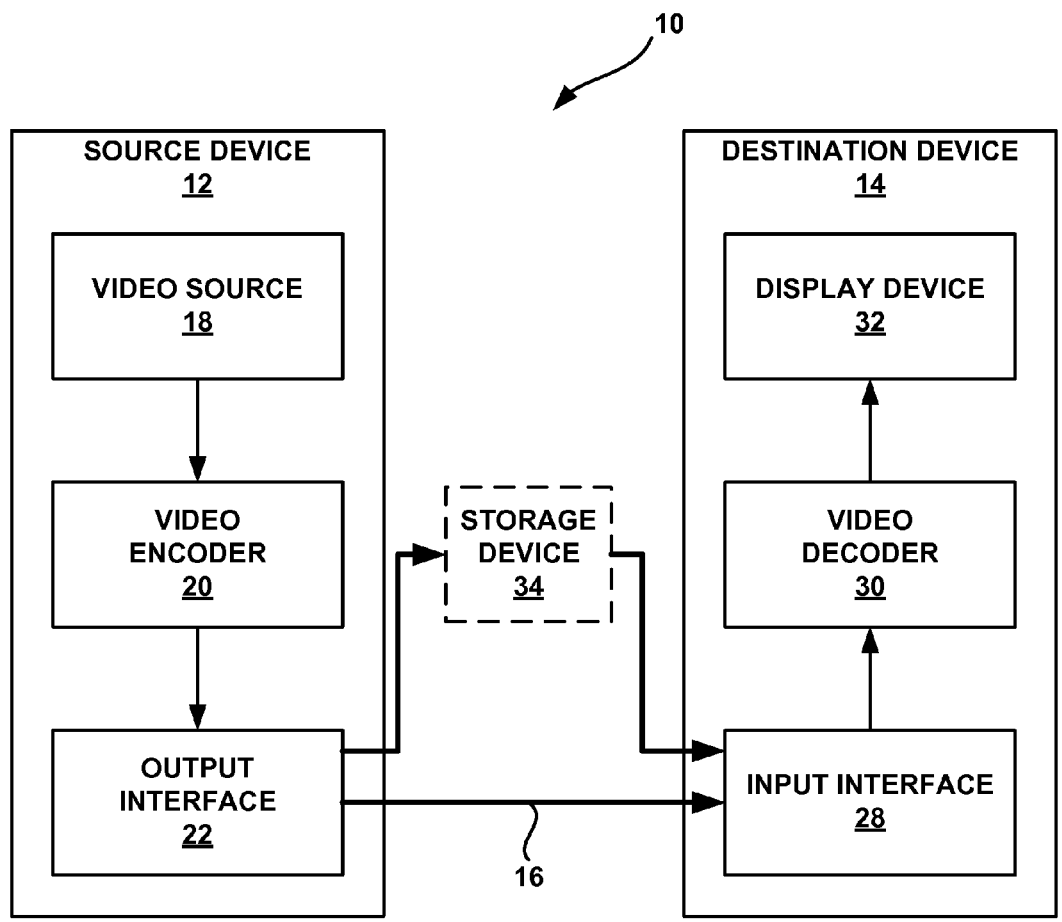
FIG. 1 is a block diagram illustrating an example video encoding and decoding system that may utilize the techniques described in this disclosure.

This disclosure relates to video coding (i.e., encoding and/or decoding of video data) and video processing, and more particularly, this disclosure describes Network Abstraction Layer (NAL) unit header designs for the newly emerging High Efficiency Video Coding (HEVC) standard and its extensions. This disclosure will generally use the term video coding to refer to either video encoding or video decoder. This disclosure also uses the term video processing, which is generally meant to include video coding but also to include other types of video processing, such as video data parsing, video data routing, video bit stream splicing, and other such processes. A video coder may generally be considered to refer to a device that encodes and/or decodes video data, while a video processor or video processing device may be considered to refer to a device that codes video data but also to a device that performs other processes on video data.

A video encoder processes original video data to generate a bitstream that includes encoded video data. Typically, the encoded video data is a compressed version of the original video data, formatted in such a way that a video decoder can reconstruct an approximation of the original video data. The bitstream, which is generated by the video encoder and decoded by the video decoder, includes a sequence of bits that forms a representation of coded pictures and associated data. Video bitstreams coded according to the HEVC standard includes a sequence of NAL units that each includes a NAL unit header and a raw byte sequence payload (RBSP). The NAL unit header may, for example, be fixed length, while the RBSP is variable length. The NAL unit header may include several syntax elements, such as a syntax element that indicates a NAL unit type code. The NAL unit type code specified by the NAL unit header indicates the type of the NAL unit, which will be explained in more detail below. An RBSP is a syntax structure containing an integer number of bytes encapsulated within a NAL unit. Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on.

NAL units that encapsulate RBSPs for video coding data (as opposed to RBSPs for parameter sets and SEI messages) may be referred to as video coding layer (VCL) NAL units. A NAL unit that encapsulates a coded slice may be referred to as a coded slice NAL unit. NAL units that encapsulate data other than video coding data are sometimes referred to as non-VCL NAL units.

In order to enable temporal and spatial scalability, the newly emerging HEVC standard allows for the creation of operation points. Operation points generally refer to sub-bitstreams that may be extracted from an original bitstream that is scalable temporally and/or with multiple layers or views. The sub-bitstreams may be extracted from the bitstream based on values of layer identifiers (e.g. spatial layer identifiers) and temporal sub-layer identifiers that identify the operation point of the bitstream. The operation points may, for example, be signaled in a parameter set, such as a video parameter set (VPS), within the bitstream. For each of the operation points, an operation point syntax structure specifies a set of layer identifiers and temporal sub-layer identifiers used to identify NAL units in the bitstream that belong to a sub-bitstream of a given operation point. In this way, a video processing device, such as a media aware network element (MANE) or other such network element, may extract NAL units that make up the sub-bitstream of the given operation point from the original bitstream based on the layer identifiers and temporal sub-layer identifiers of the NAL units.

The temporal sub-layers associated with an operation point can be signaled, for example in a VPS, by signaling the highest temporal sub-layer of the operation point. The sub-bitstream for an operation point includes the highest temporal sub-layer as well all lower sub-layers. Accordingly, in addition to the NAL unit type syntax element introduced above, NAL unit headers also include a syntax element for identifying a temporal sub-layer for the NAL unit. Based on the highest temporal sub-layer of the operation point, a video decoder or other type of video processing device (such as a network device) can identify the NAL units associated with the particular operation point. As one example, assume a temporally scalable bitstream supports frame rates of 15 frames per second (f/s), 30 f/s, and 60 f/s. The bitstream, thus, includes NAL units with three different temporal sub-layer identifiers (TemporalID), i.e. one for each of the supported frame rates. An operation point that includes video at 15 f/s includes only the NAL units with the lowest TemporalID, e.g., a TemporalID of 0. Thus, for a 15 f/s operation point, the highest temporal sub-layer corresponds to a TemporalID of 0. An operation point that includes video at 30 f/s includes the NAL units with a TemporalID of 0, as well as the NAL units with the TemporalID of 1. An operation point with video at 30 f/s includes the same frames as an operation point with video at 15 f/s, but the 30 f/s operation point also includes additional frames. Thus, for a 30 f/s operation point, the highest temporal sub-layer corresponds to a TemporalID of 1. An operation point that includes video at 60 f/s includes the NAL units with Temporal IDs of 0, 1 and 2. Thus the 60 f/s operation point includes the same frames as the 30 f/s operation point but also includes additional frames. Thus, for a 60 f/s operation point, the highest temporal sub-layer corresponds to a TemporalID of 2. As will be made clear from further examples below, the variable TemporalID, as used in this disclosure, is intended to represent the temporal sub-layer identifier for a particular NAL unit. The value signaled in a NAL unit header to convey TemporalID may be different than the value of TemporalID. As one example and as will be explained in greater detail below, the value signaled in the NAL unit header may be one, or some other positive integer value, greater than the value of TemporalID.

In addition to the temporal scalability described above, HEVC also contemplates being compatible with multi-view coding and/or scalable coding. Thus, NAL unit headers also include a layer identifier (layerID) for the NAL unit to identify to which view or layer a NAL unit corresponds. As one example, assume a spatially scalable bitstream includes a base layer as well as two enhancement layers. The base layer may, for example, have a layerID of 0, while the two enhancement layers have layerIDs of 1 and 2 respectively. As another example, 3D video may include two views with layerIDs of 0 and 1. As with the temporal ID described above, a video processing device can construct a sub-bitstream for an operation point by identifying the NAL units associated with a particular layer identifier. A particular operation point may include video that is both temporally and spatially scalable, in which case the NAL units that comprise that operation point are determined based on the values of both TemporalID and layerID as opposed to just one of those values.

According to the techniques of this disclosure, the TemporalID value for a particular NAL unit can be signaled in a NAL unit header using a syntax element "temporal_id_plus1," where the value of temporal_id_plus1 is equal to one plus the TemporalID. Thus, for a NAL unit associated with a TemporalID of 0, the value of temporal_id_plus1 is set to 001, assuming temporal_id_plus1 is a 3-bit value. For a NAL unit associated with TemporalID of 1, the value of temporal_id_plus1 is set to 010, and so on. Thus, assuming 0 is always the lowest TemporalID value for any given bitstream, then the value of temporal_id_plus1 is never less than 1 when being used to signal a TemporalID value.

By preventing the value of the syntax element temporal_id_plus1 from ever being less than 1, the techniques ensure that a NAL unit header never emulates a start code prefix. A start code prefix is a unique sequence, of for example, three bytes equal to 0x000001, embedded in the byte stream as a prefix to each NAL unit. The location of a start code prefix can be used by a decoder or video processing device to identify the beginning of a new NAL unit and the end of a previous NAL unit. By preventing the value of the TemporalID value, as signaled in a NAL unit header (e.g., the syntax element temporal_id_plus1) from ever being less than 1, the techniques of this disclosure can allow values of other syntax elements in the NAL unit header to be set to all zeros in various circumstances, without concern for the NAL unit header emulating the start code prefix.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface 28. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM)—Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, Apr. 27, 2012 to May 7, 2012. Working draft 7 of the HEVC standard is hereby incorporated by reference in its entirety. A never draft of the upcoming HEVC standard, referred to as "HEVC Working Draft 8" or "WD8," is described in document JCTVC-J1003_d7, Bross et al., "High efficiency video coding (HEVC) text specification draft 8," Joint Collaborative Team on Video Coding (JCT-VC) of ITU-T SG16 WP3 and ISO/IEC JTC1/SC29/WG11, 10th Meeting: Stockholm, Sweden, July, 2012. Working draft 8 of the HEVC standard is hereby incorporated by reference in its entirety. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013. WD10 is hereby incorporated by reference in its entirety.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As previously introduced, this disclosure describes NAL unit header designs for HEVC and its extensions. As will be explained in greater detail below, the NAL unit header designs of this disclosure may provide possible advantages, including allowing for more spatial scalability without increasing the bit overhead in the NAL unit header needed to signal a layer identification for a particular NAL unit.

As introduced above, for many video coding standards, design constraints prevent the last byte (e.g. the last 8 bits) of a NAL unit header from being all zeros. NAL units, as implemented in HEVC, include a temporal identification (TemporalID) syntax element (e.g. 3 bits) to determine a temporal scalability factor for the video data and also include a reserved syntax element (e.g. 5 bits or 6 bits) to identify information for current and future HEVC extensions. Examples of such information may, for example, include scalable layer IDs or view IDs. Thus, the reserved syntax element may generally be considered to correspond to the layerID syntax element introduced above. In order to meet the above referenced design constraint, video processing devices that generate NAL units, such as video encoder 20, are generally configured to restrict the value of the reserved syntax element to exclude the value of 00000. In other words, assuming the reserved syntax element is a 5-bit value, a video processing device may only set the value of the reserved syntax element to one of 31 values instead of 32 values because the value 00000 is excluded from possible usable values. A video processing devices, however, may set the value of the temporal identification syntax element to any of eight different values, including the value 000.

This disclosure describes techniques for meeting the above-referenced design constraint by restricting the temporal identification syntax element so as to exclude the value 000. Thus, according to the techniques of this disclosure, a three-bit temporal identification syntax may only have seven different values. Typically, the reserved syntax element, which includes more bits has been used to prevent the all-zero sequence. According to the techniques of this disclosure, however, the temporalID syntax element, rather than a syntax element with more bits, may be restricted to exclude an all-zero value, even though. By restricting the temporal identification syntax element to seven different values, the reserved syntax element can be expanded to include 32 values. In other words, according to the techniques of this disclosure, the reserved syntax element can have a value of 00000. Thus, the techniques of this disclosure may lead to improved video coding by enabling greater spatial scalability without increasing the bit overhead dedicated to signal spatial layer identifiers.

Table 1 shows an example of HEVC NAL unit syntax and semantics.

TABLE 1

| nal_unit( NumBytesInNALunit ) { | Descriptor |
|---|---|
|     forbidden_zero_bit | f(1) |
|     nal_ref_flag | u(1) |
|     nal_unit_type | u(6) |
|     temporal_id | u(3) |
|     reserved_one_5bits | u(5) |
|     NumBytesInRBSP = 0 | |
|     for( i = 2; i < NumBytesInNALunit; i++ ) { | |
|         if( i + 2 < NumBytesInNALunit && next_bits( 24 ) = = 0x000003 ) { | |
|             rbsp_byte[ NumBytesInRBSP++ ] | b(8) |
|             rbsp_byte[ NumBytesInRBSP++ ] | b(8) |
|             i += 2 | |
|             emulation_prevention_three_byte /* equal to 0x03 */ | f(8) |
|         } else | |
|             rbsp_byte[ NumBytesInRBSP++ ] | b(8) |
|     } | |
| } | |

The semantics of Table 1 will now be described. The VCL can be specified to efficiently represent the content of the video data. The NAL unit can be specified to format that data and provide header information in a manner appropriate for conveyance on a variety of communication channels or storage media. All data can be contained in NAL units, each of which contains an integer number of bytes. A NAL unit can specify a generic format for use in both packet-oriented and bitstream systems. The format of NAL units for both packet-oriented transport and byte streams may be identical except that each NAL unit can be preceded by a start code prefix and extra padding bytes in the byte stream format.

The syntax element NumBytesInNALunit specifies the size of the NAL unit in bytes. This value may be required for decoding of the NAL unit by a video decoder, such as video decoder 30. Some form of demarcation of NAL unit boundaries may be necessary to enable inference of the syntax element NumBytesInNALunit. One such demarcation method is specified in Annex B of HEVC for the byte stream format, but other methods of demarcation may also be specified. Moreover, the meaning of a value "0" and the meaning of a value "1" may be reversed in other examples.

The syntax element forbidden_zero_bit can be equal to 0. The syntax element nal_ref_flag equal to 1 specifies that the content of the NAL unit contains a sequence parameter set, a picture parameter set, an adaptation parameter set or a slice of a reference picture. The syntax element nal_ref_flag equal to 0 for a NAL unit containing a slice indicates that the slice is part of a non-reference picture. The syntax element nal_ref_flag can be equal to 1 for video parameter set, sequence parameter set, picture parameter set or adaptation parameter set NAL units. When the syntax element nal_ref_flag is equal to 0 for one VCL NAL unit of a particular picture, it can be equal to 0 for all VCL NAL units of the particular picture. The syntax element nal_ref_flag can be equal to 1 for NAL units with nal_unit_type equal to 4, 5, 6, 7, or 8. The syntax element nal_ref_flag can be equal to 0 for all NAL units having nal_unit_type equal to 29, 30, or 31.

The syntax element nal_unit_type specifies the type of RBSP data structure contained in the NAL unit as specified in Table 2. NAL units that use nal_unit_type equal to 0 or in the range of 48 to 63, inclusive, may not affect the decoding process as specified by HEVC. NAL unit types 0 and 48 to 63 may be used as determined by a specific application. No decoding process for these values of nal_unit_type is specified in HEVC. As different applications might use NAL unit types 0 and 48 to 63 for different purposes, particular care may be exercised in the design of encoders that generate NAL units with nal_unit_type equal to 0 or in the range of 48 to 63, inclusive, and in the design of decoders that interpret the content of NAL units with nal_unit_type equal to 0 or in the range of 48 to 63, inclusive.

Video decoders and video processing devices can be programmed or designed to ignore (i.e. remove from the bitstream and discard) the contents of all NAL units that use reserved values of nal_unit_type. The reserved values may allow for NAL unit types compatible with future HEVC extensions. Table 2 shows examples of NAL unit type codes and NAL unit type classes in HEVC. As already mentioned, it is contemplated that future extensions of HEVC may include additional NAL unit types.

TABLE 2

NAL unit type codes and NAL unit type classes

| nal_unit_type | Content of NAL unit and RBSP syntax structure | NAL unit type class |
|---|---|---|
| 0 | Unspecified | non-VCL |
| 1 | Coded slice of a non-RAP, non-TFD and non-TLA picture slice_layer_rbsp( ) | VCL |
| 2 | Coded slice of a TFD picture slice_layer_rbsp( ) | VCL |
| 3 | Coded slice of a non-TFD TLA picture slice_layer_rbsp( ) | VCL |
| 4, 5 | Coded slice of a CRA picture slice_layer_rbsp( ) | VCL |
| 6, 7 | Coded slice of a BLA picture slice_layer_rbsp( ) | VCL |

TABLE 2-continued

NAL unit type codes and NAL unit type classes

| nal_unit_type | Content of NAL unit and RBSP syntax structure | NAL unit type class |
|---|---|---|
| 8 | Coded slice of an IDR picture slice_layer_rbsp( ) | VCL |
| 9 . . . 24 | Reserved | n/a |
| 25 | Video parameter set video_parameter_set_rbsp( ) | non-VCL |
| 26 | Sequence parameter set seq_parameter_set_rbsp( ) | non-VCL |
| 27 | Picture parameter set pic_parameter_set_rbsp( ) | non-VCL |
| 28 | Adaptation parameter set aps_rbsp( ) | non-VCL |
| 29 | Access unit delimiter access_unit_delimiter_rbsp( ) | non-VCL |
| 30 | Filler data filler_data_rbsp( ) | non-VCL |
| 31 | Supplemental enhancement information (SEI) sei_rbsp( ) | non-VCL |
| 32 . . . 47 | Reserved | n/a |
| 48 . . . 63 | Unspecified | non-VCL |

A clear random access (CRA) picture having nal_unit_type equal to 4 may have associated tagged for discard (TFD) pictures present in the bitstream. A CRA picture having nal_unit_type equal to 5 does not have associated TFD pictures present in the bitstream. A BLA picture having nal_unit_type equal to 6 may have associated TFD pictures present in the bitstream. A broken link access (BLA) picture having nal_unit_type equal to 7 does not have associated TFD pictures present in the bitstream.

Coded slice NAL unit collectively refers to a VCL NAL unit, which has nal_unit_type in the range of 1 to 8, inclusive. The variable IdrPicFlag is specified as $$IdrPicFlag=((nal\_unit\_type==8) \text{ ?1:0}) \quad (1)$$

The variable RapPicFlag is specified as $$RapPicFlag=((nal\_unit\_type>=4 \text{ \&\& } nal\_unit\_type<=8) \text{ ?1:0}) \quad (2)$$

When the value of nal_unit_type is equal to any particular value in the range of 1 to 8, inclusive, for a NAL unit of a particular picture, all VCL NAL units of that particular picture can have nal_unit_type equal to that particular value. When the value of nal_unit_type is equal to 4 or 5 for all VCL NAL units of a particular picture, the particular picture is referred to as a CRA picture. When the value of nal_unit_type is equal to 6 or 7 for all VCL NAL units of a particular picture, the particular picture is referred to as a BLA picture.

All coded pictures that follow a CRA or BLA picture both in decoding order and output order may in some instances not use inter prediction from any picture that precedes the CRA or BLA picture either in decoding order or output order, and any picture that precedes the CRA or BLA picture in decoding order can also precede the CRA or BLA picture in output order.

It may be a requirement of bitstream conformance that no TFD pictures be present in the bitstream that are associated with a CRA picture having nal_unit_type equal to 5 or a BLA picture having nal_unit_type equal to 7.

When the value of nal_unit_type is equal to 8 for all VCL NAL units of a particular picture, that particular picture is referred to as an IDR picture. All coded pictures that follow an instantaneous decoding refresh (IDR) picture in decoding order may in some instances not use inter prediction from any picture that precedes the IDR picture in decoding order, and any picture that precedes the IDR picture in decoding order can also precede the IDR picture in output order.

Random access point (RAP) picture collectively refers to a coded picture that is a CRA picture, a BLA picture or an IDR picture, and RAP access unit collectively refers to an access unit that is a CRA access unit, a BLA access unit or an IDR access unit.

Any parameter set (video parameter set, sequence parameter set, picture parameter set, or adaptation parameter set) may need to be available before the activation of the parameter set. To be able to perform random access from any particular RAP picture by discarding all access units before the particular RAP access unit (and to correctly decode the particular RAP access unit and all the subsequent access units in both decoding and output order), the following condition must be satisfied: each parameter set that is activated during the decoding of the particular RAP access unit or during the decoding of any subsequent access unit in decoding order is either present or provided through external means at or subsequent to that particular RAP access unit and prior to any NAL unit activating that parameter set.

When the value of nal_unit_type is equal to 3 for all VCL NAL units of a particular picture, that particular picture is referred to as a TLA picture. A TLA picture and all coded pictures with temporal_id greater than or equal to the temporal_id of the TLA picture that follow the TLA picture in decoding order may in some instances not use inter prediction from any picture with temporal_id greater than or equal to the temporal_id of the TLA picture that precedes the TLA picture in decoding order. A TLA picture may in some instances not be a TFD picture. Hence, a TLA picture may also referred to as a non-TFD TLA picture.

When the syntax element temporal_id_nesting flag is equal to 1 and the syntax element temporal_id is greater than 0, the syntax element nal_unit_type can be equal to 3.

The syntax element temporal_id specifies a temporal identifier for the NAL unit. The value of temporal_id can be the same for all VCL NAL units of an access unit. When an access unit is a RAP access unit, temporal_id for all VCL NAL units of the access unit can be equal to 0. When nal_unit_type is equal to 3, temporal_id may in some instances not be equal to 0. The temporal_id of an access unit is derived as equal to the temporal_id value of the VCL NAL units in the access unit.

For a non-VCL NAL unit, the value of temporal_id can be equal to the minimum value of the temporal_id values of all access units the non-VCL NAL unit applies to. When nal_unit_type is equal to 26 (sequence parameter set), temporal_id can be equal to 0. When nal_unit_type is equal to 29 (access unit delimiter) or 30 (filler data), temporal_id can be equal to the temporal_id of the access unit containing the non-VCL NAL unit. When nal_unit_type is equal to 27 (picture parameter set) or 28 (adaptation parameter set), temporal_id may be less than, equal to, or greater than the temporal_id of the containing access unit. When nal_unit_type is equal to 31 (SEI), temporal_id may in some instances not be less than the temporal_id of the containing access unit.

In one example, when nal_unit_type is equal to 26 (sequence parameter set), temporal_id must be equal to 0, as a sequence parameter set applies at least to a RAP access unit. When nal_unit_type is equal to 29 (access unit delimiter) or 30 (filler data), temporal_id must be equal to the temporal_id of the access unit containing the non-VCL NAL unit, as access unit delimiter or filler data only applies to the containing access unit. When nal_unit_type is equal to 27 (picture parameter set) or 28 (adaptation parameter set), temporal_id may be less than, equal to, or greater than the temporal_id of the containing access unit, as a picture parameter set or adaptation parameter set may be repeated in access units not referring to the picture parameter set or adaptation parameter set for improved error resilience, and all picture parameter sets or adaptation parameter sets may be included in the beginning of a bitstream wherein the first coded picture has temporal_id equal to 0. When nal_unit_type is equal to 31 (SEI), temporal_id may be equal to or greater than the temporal_id of the containing access unit, as an SEI NAL unit may contain a picture buffering SEI message or a picture timing SEI message that applies to a bitstream subset including access units for which the temporal_id values are greater than the temporal_id of the access unit containing the SEI NAL unit.

The syntax element reserved_one_5 bits can be equal to '00001.' Other values of reserved_one_5 bits may be specified in the future by ITU-T|ISO/IEC. Decoders can ignore (i.e. remove from the bitstream and discard) NAL units with values of reserved_one_5bits not equal to '00001'.

The syntax element rbsp_byte[i] is the i-th byte of an RBSP. An RBSP is specified as an ordered sequence of bytes as follows.

The RBSP may contain an SODB as follows.

If the SODB is empty (i.e., zero bits in length), the RBSP is also empty.

Otherwise, the RBSP contains the SODB as follows:
1) The first byte of the RBSP contains the (most significant, left-most) eight bits of the SODB; the next byte of the RBSP contains the next eight bits of the SODB, etc., until fewer than eight bits of the SODB remain.
2) rbsp_trailing_bits( ) are present after the SODB as follows:
   i) The first (most significant, left-most) bits of the final RBSP byte contains the remaining bits of the SODB (if any).
   ii) The next bit consists of a single rbsp_stop_one_bit equal to 1.
   iii) When the rbsp_stop_one_bit is not the last bit of a byte-aligned byte, one or more rbsp_alignment_zero_bit is present to result in byte alignment.
3) One or more cabac_zero_word 16-bit syntax elements equal to 0x0000 may be present in some RBSPs after the rbsp_trailing_bits( ) at the end of the RBSP.

Syntax structures having these RBSP properties are denoted in the syntax tables using an "_rbsp" suffix. These structures can be carried within NAL units as the content of the rbsp_byte[i] data bytes. The association of the RBSP syntax structures to the NAL units can be as specified in 1.

When the boundaries of the RBSP are known, the decoder can extract the SODB from the RBSP by concatenating the bits of the bytes of the RBSP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.

The syntax element emulation_prevention_three_byte is a byte equal to 0x03. When an emulation_prevention_three_byte is present in the NAL unit, it may in some isntances be discarded by the decoding process.

The last byte of the NAL unit may in some instances not be equal to 0x00. Within the NAL unit, the following three-byte sequences may not occur at any byte-aligned position:
0x000000
0x000001
0x000002

Within the NAL unit, any four-byte sequence that starts with 0x000003 other than the following sequences may not occur at any byte-aligned position:
0x00000300
0x00000301
0x00000302
0x00000303

When nal_unit_type is equal to 0, particular care must be exercised in the design of encoders to avoid the presence of the above-listed three-byte and four-byte patterns at the beginning of the NAL unit syntax structure, as the syntax element emulation_prevention_three_byte cannot be the third byte of a NAL unit.

The existing techniques described above may have several shortcomings. The decoded picture buffer (DPB) size in level definitions in HEVC WD7 only supports hierarchical coding structures with group of picture (GOP) size up to 16, i.e., typically up to 5 temporal layers are supported. While at the same time: 1) the three bits used for temporal_id can represent up to 8 temporal layers, and 2) the reserved_one_5 bits, which is expected to represent the layer identifications in both scalable and 3D video extensions of HEVC, is coded by five bits, and the value 0 is reserved for the base layer, such that the maximum number of layers/views supported is 31, while in some application scenarios more layers may be needed.

This disclosure describes a potentially improved NAL unit header design. According to techniques of this disclosure the syntax element temporal_id described above can be changed to temporal_id_plus1, and the value of temporal_id_plus1 can be greater than 0. Furthermore, the syntax element reserved_one_5 bits described above may be changed to the syntax element reserved_zero_5 bits, and the value can be equal to 0 in the base specification of HEVC (i.e. not including the scalable or 3 DV extensions). Thus one more layer or view becomes possible in future HEVC extensions.

If the bit of nal_ref_flag is released and added to reserved_one_5 bits (hence the field becomes reserved_one_6 bits), as proposed above, reserved_one_6 bits is proposed to be changed to reserved_zero_6 bits, and can be equal to 0 in the base specification.

Detailed example implementations will now be described below. Table 3 below shows an example of the changed NAL unit header syntax in accordance with the techniques of this disclosure.

TABLE 3

| nal_unit( NumBytesInNALunit ) { | Descriptor |
|---|---|
| forbidden_zero_bit | f(1) |
| nal_ref_flag | u(1) |
| nal_unit_type | u(6) |
| temporal_id_plus1 | u(3) |
| reserved_zero_5bits | u(5) |
| NumBytesInRBSP = 0 | |
| for( i = 2; i < NumBytesInNALunit; i++ ) { | |
| if( i + 2 < NumBytesInNALunit && next_bits( 24 ) = = | |

TABLE 3-continued

| nal_unit( NumBytesInNALunit ) { | Descriptor |
|---|---|
| 0x000003 ) { | |
|     rbsp_byte[ NumBytesInRBSP++ ] | b(8) |
|     rbsp_byte[ NumBytesInRBSP++ ] | b(8) |
|     i += 2 | |
|     emulation_prevention_three_byte /* equal to 0x03 */ | f(8) |
|   } else | |
|     rbsp_byte[ NumBytesInRBSP++ ] | b(8) |
| } | |
| } | |

The semantics of the two changed syntax elements are as follows. The instances of "temporal_id," as used in WD7 for example, in the semantics and decoding process texts can be replaced with "temporal_id_plus1." Thus, the syntax element temporal_id_plus1 minus 1 specifies a temporal identifier for the NAL unit. The variable TemporalId is derived as equal to temporal_id_plus1 minus 1. The value of TemporalId can be the same for all VCL NAL units of an access unit. When an access unit is a RAP access unit, TemporalId for all VCL NAL units of the access unit can be equal to 0. When nal_unit_type is equal to 3, TemporalId may in some instances not be equal to 0. The TemporalId of an access unit is derived as equal to the TemporalId value of the VCL NAL units in the access unit.

For a non-VCL NAL unit, the value of TemporalId can be equal to the minimum value of the TemporalId values of all access units the non-VCL NAL unit applies to. When nal_unit_type is equal to 26 (sequence parameter set), TemporalId can be equal to 0. When nal_unit_type is equal to 29 (access unit delimiter) or 30 (filler data), TemporalId can be equal to the TemporalId of the access unit containing the non-VCL NAL unit. When nal_unit_type is equal to 27 (picture parameter set) or 28 (adaptation parameter set), TemporalId may be less than, equal to, or greater than the TemporalId of the containing access unit. When nal_unit_type is equal to 31 (SEI), TemporalId may in some instances not be less than the TemporalId of the containing access unit.

The syntax element reserved_zero_5 bits can be equal to '00000'. Other values of reserved_zero_5 bits may be specified in future HEVC extensions. Until such future extensions are finalized, video decoders and other video processing devices can ignore (i.e. remove from the bitstream and discard) NAL units with values of reserved_zero_5 bits not equal to '00000.'

Table 4 below shows another example of the changed NAL unit header syntax in accordance with the techniques of this disclosure.

TABLE 4

| nal_unit( NumBytesInNALunit ) { | Descriptor |
|---|---|
|   forbidden_zero_bit | f(1) |
|   nal_unit_type | u(6) |
|   temporal_id_plus1 | u(3) |
|   reserved_zero_6bits | u(6) |
|   NumBytesInRBSP = 0 | |
|   for( i = 2; i < NumBytesInNALunit; i++ ) { | |
|     if( i + 2 < NumBytesInNALunit && next_bits( 24 ) == 0x000003 ) { | |
|       rbsp_byte[ NumBytesInRBSP++ ] | b(8) |
|       rbsp_byte[ NumBytesInRBSP++ ] | b(8) |
|       i += 2 | |

TABLE 4-continued

| nal_unit( NumBytesInNALunit ) { | Descriptor |
|---|---|
|       emulation_prevention_three_byte /* equal to 0x03 */ | f(8) |
|     } else | |
|       rbsp_byte[ NumBytesInRBSP++ ] | b(8) |
|   } | |
| } | |

The semantics of the two changed syntax elements ("temporal_id_plus1" and "reserved_zero_6 bits") are as follows. The semantics of nal_ref_flag is removed. In the remaining text in HEVC WD7, the instances of "temporal_id" in the semantics and decoding process texts are replaced with temporal_id_plus1.

The value of the syntax element temporal_id_plus1 minus 1 specifies a temporal identifier for the NAL unit. Thus, in order to determine a temporal identifier for a NAL unit, a video processing device receives the value of the syntax element "temporal_id_plus1" and subtracts one from that value. As one example, for a NAL unit for video with a temporal identification of 0, video encoder 20 may set the value of the syntax element "temporal_id_plus1" to 1 instead of 0. Upon receiving a NAL unit with the value of the syntax element "temporal_id_plus1" set to 1, video decoder 30 or another video processing device may subtract 1 from the value of the syntax element "temporal_id_plus1" to determine that the temporal identification for the NAL unit is 0. In other words, the variable TemporalId is derived as equal to temporal_id_plus1 minus 1. The value of TemporalId can be the same for all VCL NAL units of an access unit. When an access unit is a RAP access unit, TemporalId for all VCL NAL units of the access unit can be equal to 0. When nal_unit_type is equal to 3, TemporalId may in some instances not be equal to 0. The TemporalId of an access unit is derived as equal to the TemporalId value of the VCL NAL units in the access unit.

For a non-VCL NAL unit, the value of TemporalId can be equal to the minimum value of the TemporalId values of all access units the non-VCL NAL unit applies to. When nal_unit_type is equal to 26 (sequence parameter set), TemporalId can be equal to 0. When nal_unit_type is equal to 29 (access unit delimiter) or 30 (filler data), TemporalId can be equal to the TemporalId of the access unit containing the non-VCL NAL unit. When nal_unit_type is equal to 27 (picture parameter set) or 28 (adaptation parameter set), TemporalId may be less than, equal to, or greater than the TemporalId of the containing access unit. When nal_unit_type is equal to 31 (SEI), TemporalId may in some instances not be less than the TemporalId of the containing access unit.

The syntax element reserved_zero_6 bits can be equal to '000000'. Other values of reserved_zero_6 bits may be specified in the future by ITU-T|ISO/IEC. Decoders can ignore (i.e. remove from the bitstream and discard) NAL units with values of reserved_zero_6 bits not equal to '000000'.

Figure 2:
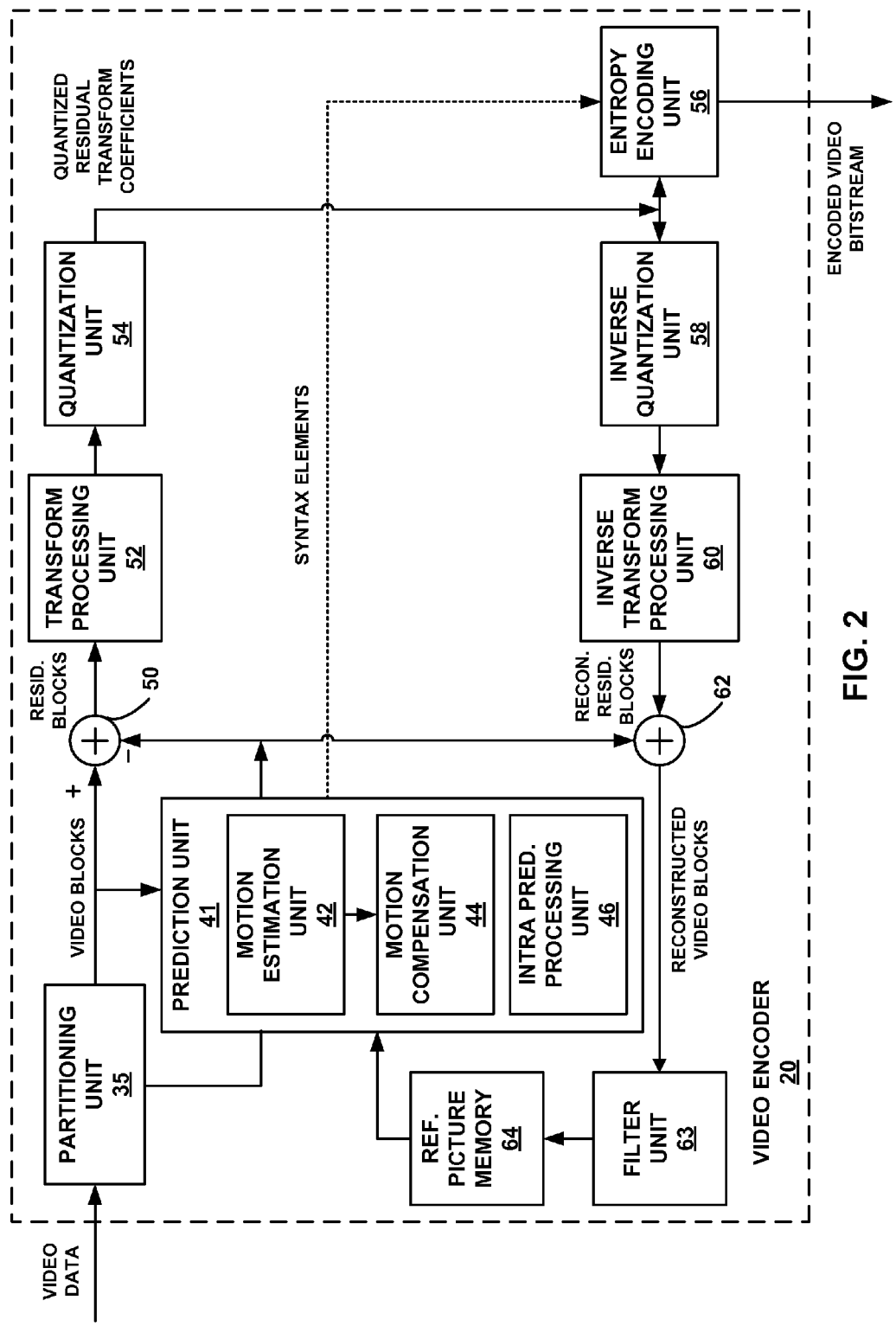
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, filter unit 63, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 2 as being an in loop filter, in other configurations, filter unit 63 may be implemented as a post loop filter.

Although not shown in FIG. 2, the encoded video bitstream may undergo further processing by a post processing unit. The techniques of this disclosure, which relate to generating and processing NAL unit headers, may be performed by either of video encoder 20 or by a post processing unit that is separate from video encoder 20. Accordingly, video encoder 20 represents an example of a video encoder that is configured to generate the syntax described above in Tables 3 and 4. Video encoder 20 may, for example, be configured to generate, for inclusion in an encoded bitstream of video data, a NAL unit where the value of a temporal_id_plus1 syntax element is one greater than the temporal identification of the video data contained in the NAL unit. Additionally, video encoder 20 may generate a value for the reserved_zero_5 bits syntax element that is an all-zero value (i.e. 00000).

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

In this manner, video encoder 20 of FIG. 2 represents an example of a video encoder configured to generate a NAL unit that comprises a temporal identification syntax element and a reserved syntax element. The temporal identification syntax element can be restricted so as to exclude an all zero value, the reserved syntax element can be permitted to include an all zero value. As mentioned above, in some instances, a post-processing unit, rather than a video encoder, may to generate a NAL unit that comprises a temporal identification syntax element and a reserved syntax element. The temporal identification syntax element can be restricted so as to exclude an all zero value, the reserved syntax element can be permitted to include an all zero value.

Figure 3:
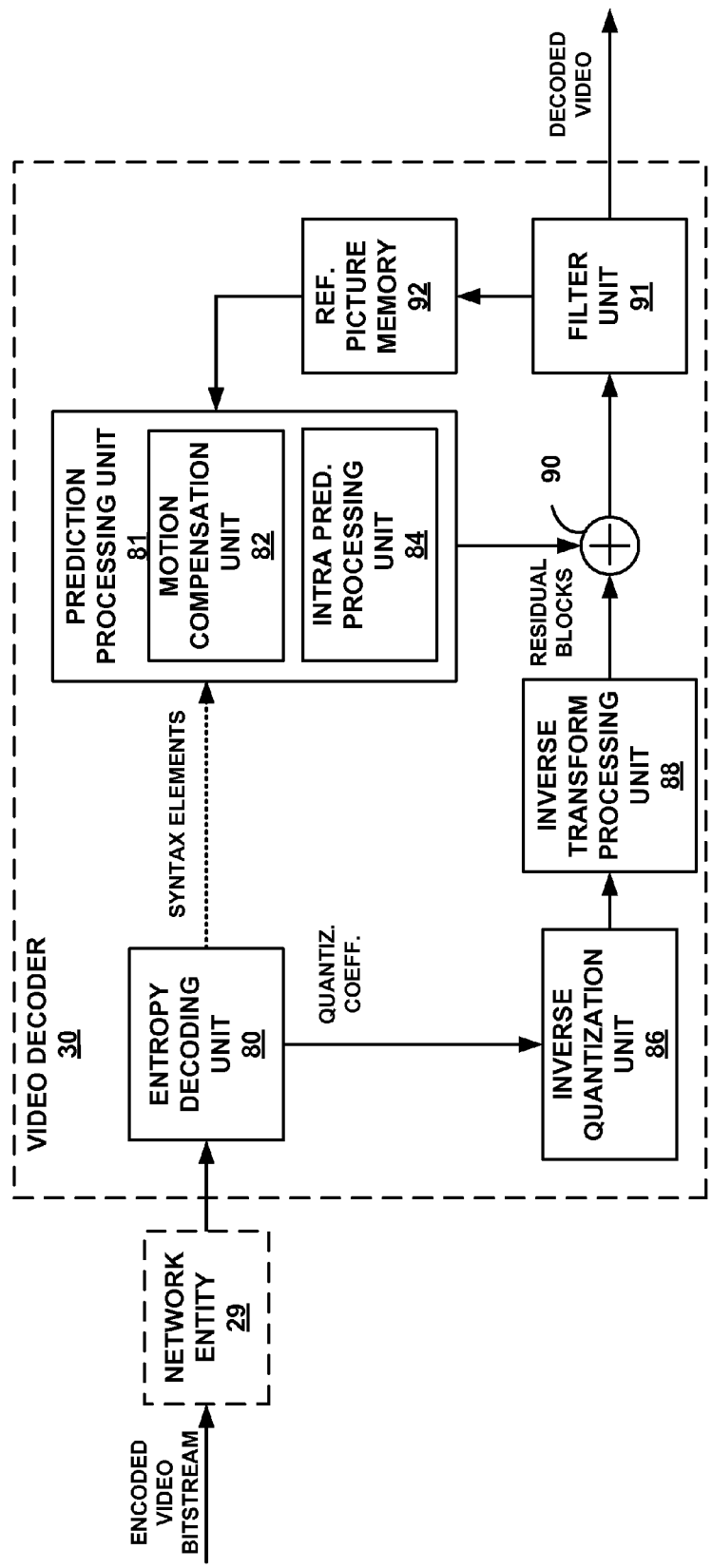
FIG. 3 is a block diagram illustrating an example video decoder that may implement the techniques described in this disclosure.

FIG. 3 is a block diagram illustrating an example video decoder 30 that may implement the techniques described in this disclosure. As will be explained in more detail below, video decoder 30 may parse syntax, such as the syntax described above in TABLES 1-4, as part of a video decoding process. In the example of FIG. 3, video decoder 30 includes an entropy decoding unit 80, prediction processing unit 81, inverse quantization unit 86, inverse transformation unit 88, summer 90, filter unit 91, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. As described above, some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30. Network entity 29 may, for example, be configured to process some or all of the syntax described above with respect to TABLES 3 and 4 while video decoder 30 is also configured to process some or all of the syntax described above with respect to TABLES 3 and 4.

As introduced above, operation points generally refer to sub-bitstreams that may be extracted from an original bitstream that is scalable temporally and/or with multiple layers or views. By processing the "temporal_id_plus1" and "reserved_zero_5 bits" syntax elements described above, network entity 29 may extract the NAL units corresponding to a particular operation point and provide those NAL units to video decoder 30.

Entropy decoding unit 80 of video decoder 30 performs an entropy decoding process on the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 3 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 of FIG. 3 represents an example of a video decoder configured to process a NAL unit to identify a temporal identification syntax element and a reserved syntax element; parse the temporal identification syntax element to determine a temporal scalability factor for the video data, wherein the temporal identification syntax element is restricted so as to exclude an all zero value; and parse the reserved syntax element, wherein the reserved syntax element is permitted to include an all zero value.

Figure 4:
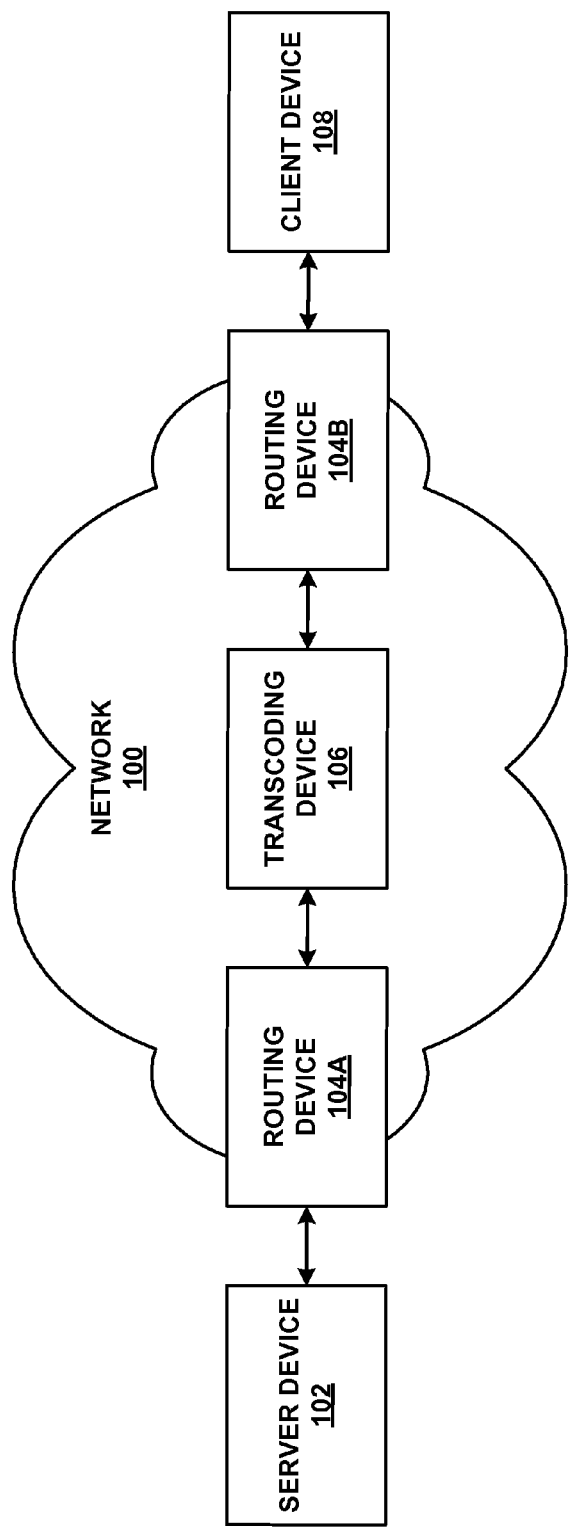
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples. One or more of routing devices 104 may comprise media aware network elements (MANE's) in some examples, and may implement one or more of the techniques described herein for receiving and interpreting NAL unit data that is defined in accordance with this disclosure. Moreover, in some examples, server device 102 includes an encoder that may implement one or more of the techniques described herein for generating NAL unit data that is defined in accordance with this disclosure. In addition, in some examples, client device 108 includes a decoder that may implement one or more of the techniques described herein for receiving and interpreting NAL unit data that is defined in accordance with this disclosure.

In general, routing devices 104 implement one or more routing protocols to exchange network data through network 100. In some examples, routing devices 104 may be configured to perform proxy or cache operations. Therefore, in some examples, routing devices 104 may be referred to as proxy devices as well. In general, routing devices 104 execute routing protocols to discover routes through network 100. By executing such routing protocols, routing device 104B may discover a network route from itself to server device 102 via routing device 104A.

Transcoding device 106 may perform the techniques of this disclosure to process a NAL unit to identify a temporal identification syntax element and a reserved syntax element; parse the temporal identification syntax element to determine a temporal scalability factor for the video data, wherein the temporal identification syntax element is restricted so as to exclude an all zero value; and parse the reserved syntax element, wherein the reserved syntax element is permitted to include an all zero value. Transcoding device 106 may, for example, process "temporal_id_plus1" and "reserved_zero_5 bits" syntax elements described above as part of extracting the NAL units corresponding to a particular operation point and provide those NAL units to video decoder 30. More particularly, transcoding device 106 may subtract one from the value of syntax element "temporal_id_plus1" to determine a temporal identification for a particular NAL unit.

Figure 5:
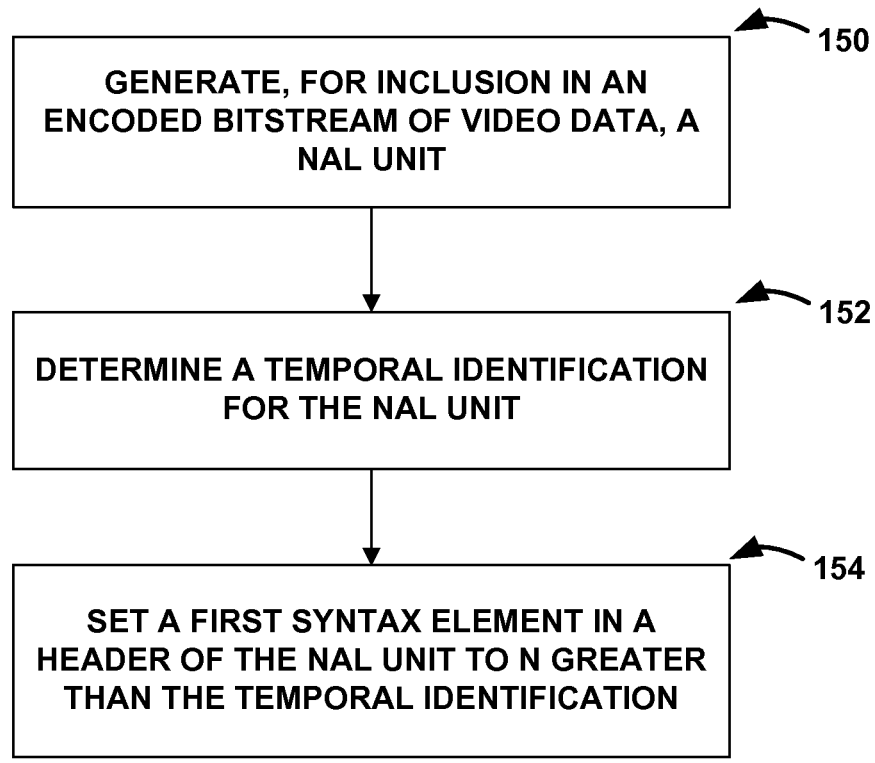
FIG. 5 is a flowchart showing an example method of encoding video data according to the techniques of the disclosure.

FIG. 5 is a flowchart showing an example method of encoding video data according to the techniques of the disclosure. The techniques of FIG. 5 will be described with respect to a video processing device, which may, for example, correspond to a video encoder, such as video encoder 30, or to a network element, such as any of network entity 29, routing device 104A or routing device 104B, or transcoding device 106. The video processing device may generate, for inclusion in an encoded bitstream of video data, a NAL unit (150). The video processing device may determine a temporal identification for the NAL unit (152). The video processing device may set a first syntax element in a header of the NAL unit to N greater than the temporal identification (154). N represents a positive integer that may in some examples be equal to one although other values of N may also be used.

Figure 6:
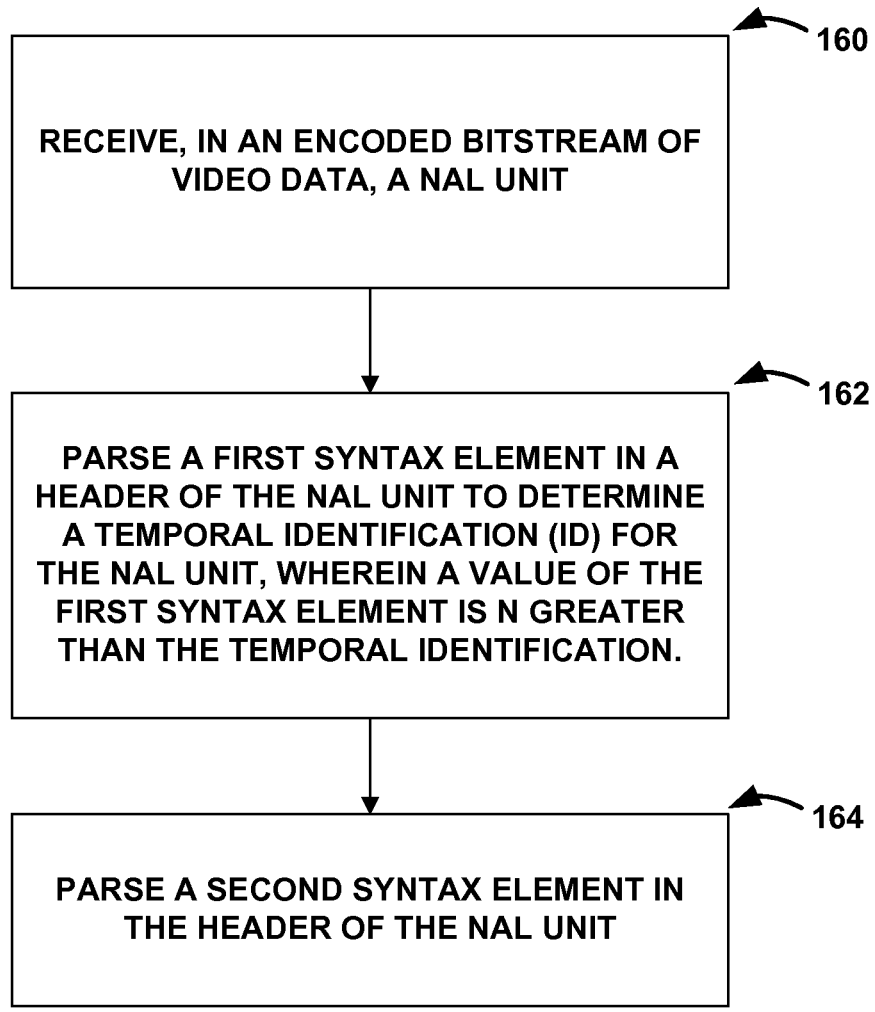
FIG. 6 is a flowchart showing an example method of processing video data according to the techniques of the disclosure.

FIG. 6 is a flowchart showing an example method of processing video data according to the techniques of the disclosure. The techniques of FIG. 6 will be described with respect to a video processing device, which may, for example, correspond to a video decoder, such as video decoder 30, or to a network element, such as any of network entity 29, routing device 104A or routing device 104B, or transcoding device 106. The techniques of FIG. 6, however, are not limited to any particular device and may be performed by devices other than those listed above.

The video processing device receives, in an encoded bitstream of video data, a NAL unit (160). The video processing device parses a first syntax element in a header of the NAL unit to determine a temporal identification (ID) for the NAL unit (162). A value of the first syntax element is N greater than the temporal identification. Thus, the value of the first syntax element is a non-zero value. N represents a positive integer that may in some examples be equal to one although other values of N may also be used. The video processing device parses a second syntax element in the header of the NAL unit (164). The second syntax element is permitted to include an all zero value, and the value of the second syntax element corresponds to a layer identifier for the NAL unit. The temporal identification for the NAL unit may, for example, correspond to a lowest temporal layer of video data in the encoded bitstream. In some examples, the first syntax element may be a three-bit syntax element while the second syntax element is a five-bit syntax element. Unlike the first syntax element, the second the second syntax element may be an all zero value.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:

receiving in an encoded bitstream of video data a network abstraction layer (NAL) unit;

parsing a temporal identification syntax element in a header of the NAL unit, wherein a value of the temporal ID syntax element is N greater than a temporal identification value for the NAL unit, wherein N comprises a positive integer, wherein the temporal identification value for the NAL unit is a value of zero and corresponds to a lowest temporal layer of video data in the encoded bitstream, and wherein the value of the temporal ID syntax element is a non-zero value;

processing the NAL unit based on the temporal identification value for the NAL unit; and decoding the encoded bitstream using the processed NAL unit to produce decoded video.

2. The method of claim 1, wherein N equals 1.

3. The method of claim 1, further comprising:

parsing a second syntax element in the header of the NAL unit, wherein the second syntax element is permitted to include an all zero value, wherein the second syntax element comprises a layer identifier.

4. The method of claim 3, wherein the temporal ID syntax element comprises three bits and the second syntax element comprises six bits.

5. The method of claim 3, wherein the second syntax element comprises an all zero value.

6. The method of claim 1, further comprising:

subtracting N from the value of the temporal ID syntax element to determine the temporal identification value for the NAL unit.

7. The method of claim 1, wherein the method is performed by a video decoder.

8. The method of claim 1, wherein the method is performed by a network element.

9. A method of processing video data, the method comprising:

generating, for inclusion in an encoded bitstream of video data, a network abstraction layer (NAL) unit;

determining a temporal identification for the NAL unit;

setting a temporal identification (ID) syntax element in a header of the NAL unit, to N greater than a temporal identification value for the NAL unit, the temporal identification value for the NAL unit is a value of zero and corresponds to a lowest temporal layer of video data in the encoded bitstream, and wherein the value of the temporal ID syntax element is a non-zero value;

processing the NAL unit based on the temporal identification value for the NAL unit; and including the processed NAL unit in an encoded bitstream produced by an encoder.

10. The method of claim 9, wherein N equals 1.

11. The method of claim 9, further comprising:

setting a second syntax element in the header of the NAL unit, wherein the second syntax element is permitted to include an all zero value, wherein the second syntax element comprises a layer identifier.

12. The method of claim 11, wherein the temporal ID syntax element comprises three bits and the second syntax element comprises six bits.

13. The method of claim 11, wherein the second syntax element comprises an all zero value.

14. A device for processing video data, the device comprising:

a memory configured to store video data; and one or more processors configured to receive in an encoded bitstream of the video data a network abstraction layer (NAL) unit; parse a temporal identification (ID) syntax element in a header of the NAL unit, wherein a value of the temporal ID syntax element is N greater than a temporal identification value for the NAL unit, wherein N comprises a positive integer, wherein the temporal identification value for the NAL unit has a value of zero and corresponds to a lowest temporal layer of video data in the encoded bitstream, and wherein the value of the temporal ID syntax element is a non-zero value;

process the NAL unit based on the temporal identification value for the NAL unit; and decode the encoded bitstream using the processed NAL unit to produce decoded video.

15. The device of claim 14, wherein N equals 1.

16. The device of claim 14, wherein the one or more processors are further configured to parse a second syntax element in the header of the NAL unit, wherein the second syntax element is permitted to include an all zero value, wherein the second syntax element comprises a layer identifier.

17. The device of claim 16, wherein the temporal ID syntax element comprises three bits and the second syntax element comprises six bits.

18. The device of claim 16, wherein the second syntax element comprises an all zero value.

19. The device of claim 14, wherein the one or more processors are further configured to subtract N from the value of the temporal ID syntax element to determine the temporal identification value for the NAL unit.

20. The device of claim 14, wherein the device comprises a video decoder.

21. The device of claim 14, wherein the device comprises a network element.

22. The device of claim 14, wherein the device comprises at least one of:

an integrated circuit;

a microprocessor; or a wireless communication device that includes the video decoder.

23. An apparatus for processing video data, the apparatus comprising:

means for receiving in an encoded bitstream of video data a network abstraction layer (NAL) unit;

means for parsing a temporal identification syntax element in a header of the NAL unit, wherein a value of the temporal ID syntax element is N greater than a temporal identification value for the NAL unit, wherein N comprises a positive integer, wherein the temporal identification value for the NAL unit has a value of zero and corresponds to a lowest temporal layer of video data in the encoded bitstream, and wherein the value of the temporal ID syntax element is a non-zero value;

means for processing the NAL unit based on the temporal identification value for the NAL unit; and including the processed NAL unit in an encoded bitstream produced by an encoder.

24. The apparatus of claim 23, wherein N equals 1.

25. The apparatus of claim 23, further comprising:

means for parsing a second syntax element in the header of the NAL unit, wherein the second syntax element is permitted to include an all zero value, wherein the second syntax element comprises a layer identifier.

26. The apparatus of claim 25, wherein the temporal ID syntax element comprises three bits and the second syntax element comprises six bits.

27. The apparatus of claim 25, wherein the second syntax element comprises an all zero value.

28. The apparatus of claim 23, further comprising:
means for subtracting N from the value of the temporal ID syntax element to determine the temporal identification value for the NAL unit.

29. The apparatus of claim 23, wherein the apparatus comprises a video decoder.

30. The apparatus of claim 23, wherein the apparatus comprises a network element.

31. A computer-readable storage medium storing instructions that when executed by one or more processors cause the one or more processors to:
receive in an encoded bitstream of video data a network abstraction layer (NAL) unit;
parse a temporal identification (ID) syntax element in a header of the NAL unit, wherein a value of the temporal ID syntax element is N greater than a temporal identification value for the NAL unit, wherein N comprises a positive integer, wherein the temporal identification value for the NAL unit has a value of zero and corresponds to a lowest temporal layer of video data in the encoded bitstream, and wherein the value of the temporal ID syntax element is a non-zero value;
process the NAL unit based on the temporal identification value for the NAL unit; and
decode the encoded bitstream using the processed NAL unit to produce decoded video.

32. The computer-readable storage medium of claim 31, wherein N equals 1.

33. The computer-readable storage medium of claim 31, further storing instructions that when executed by the one or more processors cause the one or more processors to:
parse a second syntax element in the header of the NAL unit, wherein the second syntax element is permitted to include an all zero value, wherein the second syntax element comprises a layer identifier.

34. The computer-readable storage medium of claim 33, wherein the temporal ID syntax element comprises three bits and the second syntax element comprises six bits.

35. The computer-readable storage medium of claim 33, wherein the second syntax element comprises an all zero value.

36. The computer-readable storage medium of claim 31, further storing instructions that when executed by the one or more processors cause the one or more processors to:
subtract N from the value of the temporal ID syntax element to determine the temporal identification value for the NAL unit.

\* \* \* \* \*